United States Patent Office.

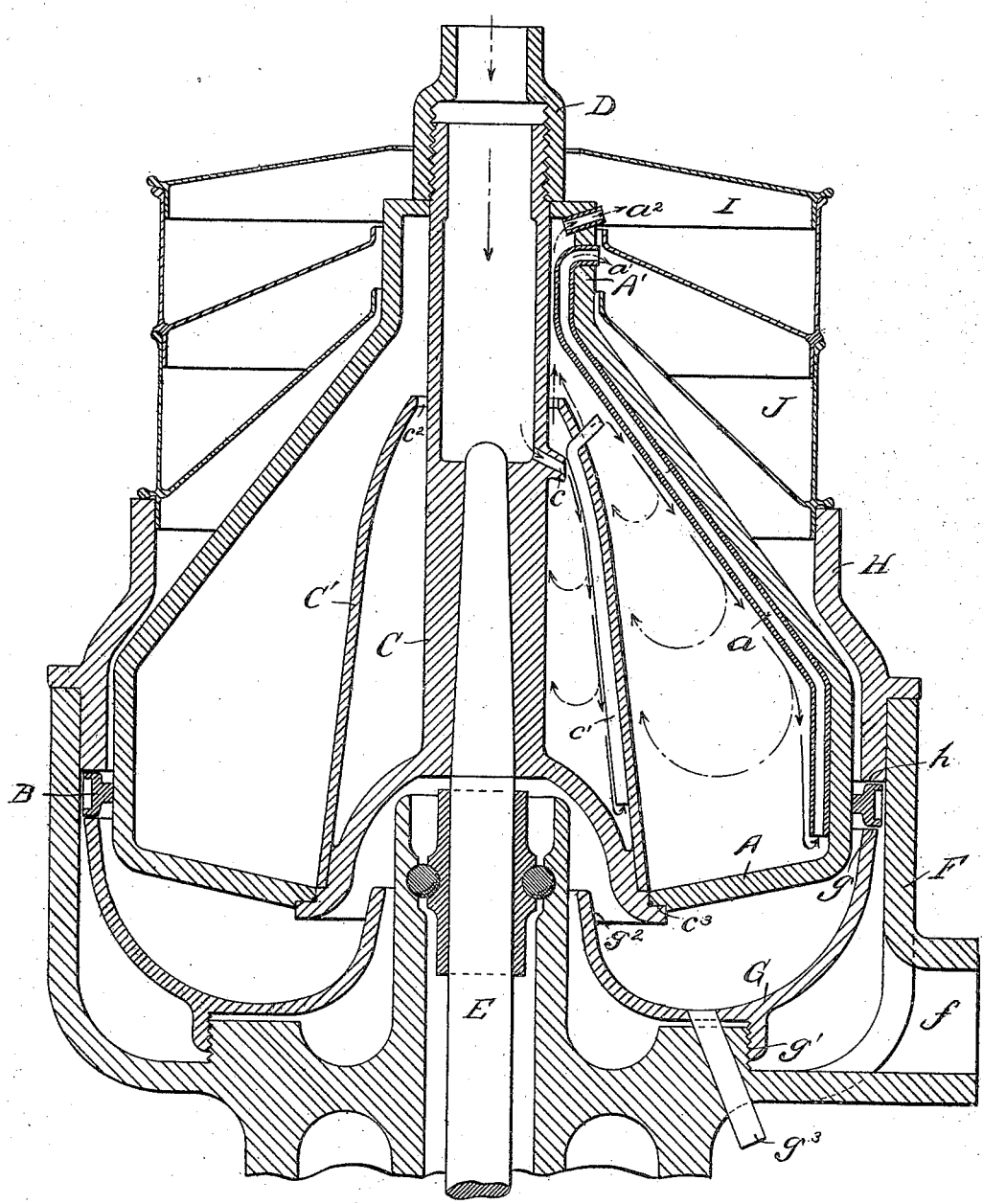

PHILIP M. SHARPLES, OF WESTCHESTER, PENNSYLVANIA.

CENTRIFUGAL LIQUID-SEPARATOR.

SPECIFICATION forming part of Letters Patent No. 690,883, dated January 7, 1902.

Application filed March 27, 1893. Serial No. 467,765. (No model.)

*To all whom it may concern:*

Be it known that I, PHILIP M. SHARPLES, a citizen of the United States, residing at Westchester, in the county of Chester, State of Pennsylvania, have invented certain Improvements in Centrifugal Separators, of which the following is a specification.

This invention relates to centrifugal machines for separating compound liquids, such as milk. In Patent No. 442,461, issued to me and D. T. Sharples jointly, (reissued February 28, 1893, No. 11,311,) is described a machine of this class in which the centrifugal vessel is rotated by the action of a steam or other jet operating directly upon it, and in Patent No. 496,622, issued May 2, 1893, to the same inventors is described a similar machine in which the central portion of the centrifugal vessel is occupied by a separate chamber or milk-receptacle, which is arranged to serve as a primary or partial separator.

The main objects of the present invention are, first, to enable the different cream particles to separate from the blue milk at minimum distances from the cream zone and so that they enter the latter with the least friction and agitation of the rotating liquid; second, to make the removal and cleaning of the vessels more convenient, and, third, to enable the vessel and its contents to be perfectly protected from the exhausting steam.

To these ends the invention consists in the improved form and arrangement of the primary separator and the main vessel and of the latter in connection with the fixed casing, which will be fully described by reference to the accompanying drawings, and the novel features of which will be specifically pointed out in the claims.

The figure is a sectional elevation of a machine embodying all the features of my invention.

Referring to the drawing, which embodies all the features of my invention, A represents the main separator vessel, which is shown of substantially conical form, with a neck A' at the small end and a comparatively large central opening in the bottom. This vessel is mounted upon a center piece C on the spindle E, which center piece is adapted to close said opening and to form a seat $c^3$ for the base of the vessel, and which extends through its neck A'. The vessel is pressed tightly to its seat $c^3$ by means of a top nut D. The spindle E is mounted in a suitable bearing or bearings on the frame F of the machine, which latter is extended, as usual, to form a casing for the lower portion of the vessel.

B represents a bucket-ring at the periphery of the vessel, against which a jet, preferably of steam, from a suitably-located nozzle (not shown) operates to rotate the vessel in the manner indicated more fully in the prior patent before referred to. The skim-milk is discharged through a tube $a$ at $a'$ into a receptacle J, and the cream discharges at $a^2$ into a receptacle I, which receptacles are carried, as usual, by the top piece H of the casing.

The center piece C is represented as hollow, so as to permit the introduction of the milk into the vessel through the open top of the nut D, and an inlet or inlets $c$ being provided into the bowl. It is formed with an outer shell C' of substantially conical shape and of a diameter sufficiently small to easily enter the bottom opening in the vessel A. This shell thus forms an annular chamber within the main vessel, which chamber is provided with a milk-conduit $c'$ from the large diameter of the chamber, arranged to discharge into the main vessel, as shown. The milk-inlet $c$ delivers into the small end of the chamber, which is also provided with a cream-outlet $c^2$.

The top piece H of the casing has its lower edge $h$ arranged close to the top of the bucket-ring B, and the bottom face of the ring runs close to the top $g$ of a plate G, which is secured to the frame F at $g'$. These two fixed parts G and H thus form an annular space bounded below and above by the faces $g$ and $h$, respectively, in which space the bucket-ring B turns. The casing F is provided with an exhaust-opening $f$, through which the steam after it has expended its motive force upon the buckets freely escapes, while the arrangement of the plate G in connection with the casing H and the bucket-ring, as described, effectually prevents it from coming in contact with the vessel A and affecting the temperature of the liquid contained in it. At the same time, if this heating effect is desired it may be secured by so adjusting the plate G as to bring its face $g$ a greater or less distance below the bucket-ring, thus allowing space for the admission of steam above the plate G.

When the portions H and G are adjusted closely to the bucket-ring B, the latter acts after the manner of a centrifugal pump and causes a downflow of air from above and an upflow of air from below in contact with the outer surface of the bowl A, thereby keeping the same cool.

The partition-plate G is adapted to serve another purpose besides that of preventing contact of the exhaust-steam with the rotating vessel. It is made in the form of an annular ring, through the central opening of which the spindle E passes. In cross-section this ring is dish-shaped, thus converting it into an annular pan, the outer edge of which reaches up to the bucket-ring B, as has been already described, while the inner edge $g^2$ is inside of the seat $c^3$ of the vessel A. Thus it will be seen that this annular pan is adapted to receive whatever liquid remains in the vessel A when the rotation of the latter is stopped and the nut D loosened to remove the vessel for cleaning or any other purpose. A spout $g^3$ is provided to discharge this liquid from the pan G.

In operating the machine the whole milk enters at the top through the hollow center piece C and the inlet $c$ into the primary separating-chamber. Here under the centrifugal action the lighter and more easily separated particles of cream at once separate and move toward the center, thus promptly getting into their normal cream zone, as indicated by the arrows. The mass of milk moves toward the larger diameter of the chamber, being constantly subjected to increasing centrifugal action, by which new particles of cream are constantly separated and find their way into the cream zone. Having reached the outlet at the largest diameter of the chamber, the milk, with such particles of cream as remain, enters the conduit $c'$ and is discharged through it into the main vessel A. Here the same operation is continued under greater centrifugal action, due to the increasing distance from the center of rotation, the cream particles as fast as they are detached moving inward and upward along the shell $C'$ of the primary separating-chamber and joining the cream from the latter, with which it discharges at the common outlet $a^2$, while the completely-skimmed milk enters the tube $a$ and discharges at $a'$.

When it is desired to remove the vessel A, the nut D is loosened and the liquid remaining in the vessel is allowed to fall into the pan G, as already described. The vessel is then easily removed, the whole of the center piece remaining in place, and is readily cleaned.

Having thus described my invention and its practical application, I do not desire to limit myself to the particular construction shown; but

What I claim is—

1. In a centrifugal separator, the combination of a separating vessel having a large central opening at one end, a center piece adapted to form a seat for said vessel and to close said opening therein, said center piece having a central extension projecting through the opposite end of the vessel and serving as a means of fastening the vessel to the spindle, and a receiver located below the vessel and its center piece and adapted to catch the contents of said vessel when it is loosed from its seat, substantially as specified.

2. In a centrifugal separator, the combination of the separating vessel having projecting peripheral buckets with fixed plates surrounding said separating vessel and forming between them an annular pathway for the rotating buckets, said plates also forming passages around the separating vessel through which passages air can pass, substantially as specified.

3. The combination of the separating-bowl having an inlet for the full milk, a discharge for the skim-milk communicating with the peripheral portion of the bowl, and a cream-discharge communicating with the cream-space of the bowl, with a hollow separating-cone extending through the liquid-space of the bowl and having a cream-discharge at about the same distance radially from the axis of the bowl as the receiving end of the cream-outlet of said bowl, said cone being provided with a duct leading from the large end of the same toward the small end and serving for the passage of liquid from the inside of the cone at the large end to the outside of the cone at or near the small end, whereby the full milk is first separated within the cone, and the cream is discharged from the cream-outlet of said cone, while partially-skimmed milk passes from the large end of the cone into the chamber surrounding the cone at the upper portion of said chamber in which chamber the partially-skimmed milk is separated and from which chamber the cream and the skim-milk are separately discharged, substantially as specified.

4. The combination of the separating-bowl having an inlet for the full milk, a discharge for the skim-milk communicating with the peripheral portion of the bowl near the bottom of the same, and a cream-discharge communicating with the cream-space of the bowl, with a hollow separating-cone extending through the liquid-space of the bowl, and having a cream-discharge at about the same distance radially from the axis of the bowl as the receiving end of the cream-outlet of said bowl, said cone being provided with a duct leading from the large end of the same toward the small end and serving for the passage of the liquid from the inside of the cone at the large end to the outside of the cone at or near the small end, whereby the full milk is first separated within the cone and the cream is discharged from the cream-outlet of said cone, while the partially-skimmed milk passes from the large end of the cone into the chamber surrounding the cone at the upper portion of said chamber, in which chamber the partially-skimmed milk is further separated and from which chamber the cream and the skim-milk are separately discharged, the skim-milk discharge being from the bottom of the chamber, substantially as specified.

In testimony whereof I affix my signature in presence of two witnesses.

PHILIP M. SHARPLES.

Witnesses:
A. R. LODGE,
M. SHARPLES.